US008026497B2

(12) United States Patent
Briggs et al.

(10) Patent No.: US 8,026,497 B2
(45) Date of Patent: Sep. 27, 2011

(54) METHODS AND APPARATUS FOR GENERATING ULTRAVIOLET LIGHT

(75) Inventors: David Briggs, Reading (GB); Richard Little, Southampton (GB)

(73) Assignee: Jenact Limited, Hampshire (GB)

( * ) Notice: Subject to any disclaimer, the term of this patent is extended or adjusted under 35 U.S.C. 154(b) by 273 days.

(21) Appl. No.: 12/270,353

(22) Filed: Nov. 13, 2008

(65) Prior Publication Data

US 2009/0127480 A1 May 21, 2009

(30) Foreign Application Priority Data

Nov. 13, 2007 (GB) .................................. 0722260.7

(51) Int. Cl.
*G01J 3/10* (2006.01)
(52) U.S. Cl. .................. 250/504 R; 219/121.43; 315/39
(58) Field of Classification Search ............... 250/504 R
See application file for complete search history.

(56) References Cited

U.S. PATENT DOCUMENTS

| | | | | |
|---|---|---|---|---|
| 2,706,782 | A * | 4/1955 | Mumford | 331/78 |
| 2,939,992 | A * | 6/1960 | Peifer | 315/3.5 |
| 3,872,349 | A | 3/1975 | Spero et al. | |
| 3,911,318 | A | 10/1975 | Spero et al. | |
| 3,943,403 | A | 3/1976 | Haugsjaa et al. | |
| 5,027,041 | A | 6/1991 | Godyak et al. | |
| 5,847,517 | A * | 12/1998 | Ury et al. | 315/248 |
| 6,028,315 | A * | 2/2000 | Bailey et al. | 250/455.11 |
| 6,118,130 | A | 9/2000 | Barry | |
| 6,162,406 | A * | 12/2000 | Michael | 422/186.3 |
| 6,348,669 | B1 * | 2/2002 | Little et al. | 219/121.43 |
| 6,507,030 | B1 | 1/2003 | Briggs et al. | |
| 6,617,806 | B2 * | 9/2003 | Kirkpatrick et al. | 315/248 |
| 7,016,566 | B2 * | 3/2006 | Dimas et al. | 385/35 |
| 2006/0060577 | A1 | 3/2006 | Little et al. | |

FOREIGN PATENT DOCUMENTS

| | | | |
|---|---|---|---|
| EP | 0790640 | A3 | 8/1997 |
| GB | 1482950 | A | 8/1977 |

* cited by examiner

*Primary Examiner* — Phillip A Johnston
(74) *Attorney, Agent, or Firm* — Sandra Poteat Thompson; Buchalter Nemer

(57) ABSTRACT

A housing for an elongate electrodeless bulb which is energiseable by an rf field such as a microwave field, preferably at or around 2.45 GHz. The housing is constructed of electrically conductive material and is arranged to have a substantially unobstructed opening through which the bulb is visible from outside the housing, and the housing is arranged to hold the bulb in a position which is recessed into the housing such that in use, the bulb is energized by virtue of its position within the housing and adjacent surrounding conductive parts of the housing substantially attenuate the rf field near the opening so that the rf field strength outside the housing is substantially zero whereby visible light or UV light is freely allowed out through the opening.

14 Claims, 6 Drawing Sheets

METHODS AND APPARATUS FOR GENERATING ULTRAVIOLET LIGHT

CROSS-REFERENCE TO RELATED APPLICATIONS

This application claims the benefit of priority of UK Patent Application No. GB0722260.7, filed Nov. 13, 2007, the contents of which are incorporated by reference herein in their entirety.

TECHNICAL FIELD

This invention relates to methods and apparatus for emitting ultraviolet light.

BACKGROUND

It is well known that ultraviolet light (UV) may be emitted by mercury/inert gas based plasmas in quartz tubes and that the wavelengths of such emissions is generally between 180 and 420 nm. Applications of such UV light include the disinfection of bacteria, very often because of the UV disturbance of DNA. Another potential application of UV light involves the photopolymerisation of liquids such as inks, adhesives and resins.

Energisation of mercury-based plasmas may be achieved by the striking of an arc across electrodes within the plasma or by the excitation of the plasma by radio frequency (rf) radiation, often at microwave frequencies around 2.45 GHz.

Energisation of UV emitting plasmas by microwave irradiation is disclosed, for example, in U.S. Pat. No. 3,872,349 (Spero et al). The advantages of microwave-energised UV emission plasmas over arc-energised plasmas are significant and include the minimisation of degradation over time and the ability to pulse and re-strike plasmas instantly giving many operational advantages in practical situations.

U.S. Pat. No. 3,911,318 (Spero et al.) discloses a microwave energised UV emission system in which ultraviolet light is emitted over 360 degrees but the light output of this technology and that of other derived and similar patents such as U.S. Pat. No. 3,943,403 (Osbourne et al.) is restricted by the attenuation of the conductive mesh that is necessary to direct and contain the microwave radiation in order to efficiently and safely energise the UV emission plasma source.

U.S. Pat. No. 6,348,669 (Little et al.) and U.S. Pat. No. 6,507,030 (Briggs et al) disclose the behaviour of an energised mercury/inert gas plasma in the form of a lossy conductor. This allows the plasma to be used to transmit rf/microwave energy if used as part of a transmission system or to attenuate it if used to block rf/microwave emission or transmission. Such methods have a disadvantage in that in a situation when a bulb is used to block the passage of microwaves, the large dimensions of the bulb and the inability of UV to be passed through an energised plasma make the efficient focussing of such light difficult and in some cases impossible. Many UV process require the high intensity that can only be achieved by focussing of emitted light. (For example, see U.S. Pat. No. 6,118,130 (Barry))

In addition, U.S. patent application Ser. No. 11/228,632 (Little and Briggs) discloses the use of tubes that are of a diameter less than 0.5 wavelength of the microwave frequency chosen (typically 2.45 GHz), to block microwave emission from a cavity provided that the length of the tube is beyond cut-off for that wavelength.

SUMMARY

In a first aspect, a housing for a coaxially mounted electrodeless bulb is provided which is energiseable by an rf field such as a microwave field, preferably at or around 2.45 GHz, wherein the housing is arranged to have a substantially unobstructed opening through which the bulb is visible from outside the housing and wherein the housing is arranged to hold an electrodeless bulb in a position which is recessed into the housing such that in use, the electrodeless bulb is energised as a result of its position within the conductive housing and the housing is dimensioned to extend beyond the end of the bulb sufficiently such that the adjacent parts of the housing beyond the end of the bulb operate beyond cut-off and thus prevents any emission of microwave energy.

With suitable dimensioning, the housing and the energised bulb together form a transmission line system with the bulb (once energised) effectively forming the centre conductor of a coaxial transmission line and air forming the dielectric. Once the effective centre conductor terminates, the transmission line is terminated and reflection occurs at its end. This is operation in so-called "cut-off". The applicant has recognised that this technique may be used to overcome the shadowing problems of prior techniques, as described in detail below.

The present invention discloses a method of energising electrodeless plasma bulbs so that they can emit UV or visible light for practical use but without the restriction presented by the requirement for any mesh for microwave containment and thus the losses sustained by such mesh. The present invention also allows for effective optical focussing of emitted UV/visible light as the prevention of rf/microwave leakage from the emission system becomes independent of the microwave energised plasma bulb(s).

In the present invention the fact that the microwave induced plasma in an electrodeless bulb behaves as a lossy conductor is exploited and such a bulb takes the place of a centre conductor in a co-axial system. In the prior art, such co-axial systems are constructed so that the diameter/cross section of the outer conductor is such that microwave transmission through the coaxial system can be efficiently sustained if a centre conductor is present and cannot be sustained if it is absent.

In addition to removing the need for mesh for energisation reasons it should be noted that the present invention overcomes the problems encountered if a mesh conductor is damaged in a conventional microwave UV system and causes escape of rf/microwave in such a way to cause danger. Such prior art systems require the presence of a secondary, expensive rf/microwave detector for safety monitoring.

In the present invention, by ensuring that a predetermined length of the outer conductor has no centre conductor present it becomes impossible for there to be dangerous rf/microwave leakage despite there being no containment mesh.

In the present invention such outer conductors can be independent systems with direct microwave energisation or be coupled to microwave cavities singularly or in multiples.

In addition, the present invention allows for the presence of microwave transparent reflective material such as quartz glass with suitable reflective coating or UV reflective flouropolymers such as those disclosed by WL Gore Corporation (U.S. Pat. No. 5,689,364 McGregor et al.) in order to focus UV/visible light energy that is emitted from the system for practical use.

BRIEF DESCRIPTION OF THE DRAWINGS

The invention will now be described, by way of example, with reference to the drawings in which.

DETAILED DESCRIPTION OF THE DRAWINGS

Figures 1, 2:
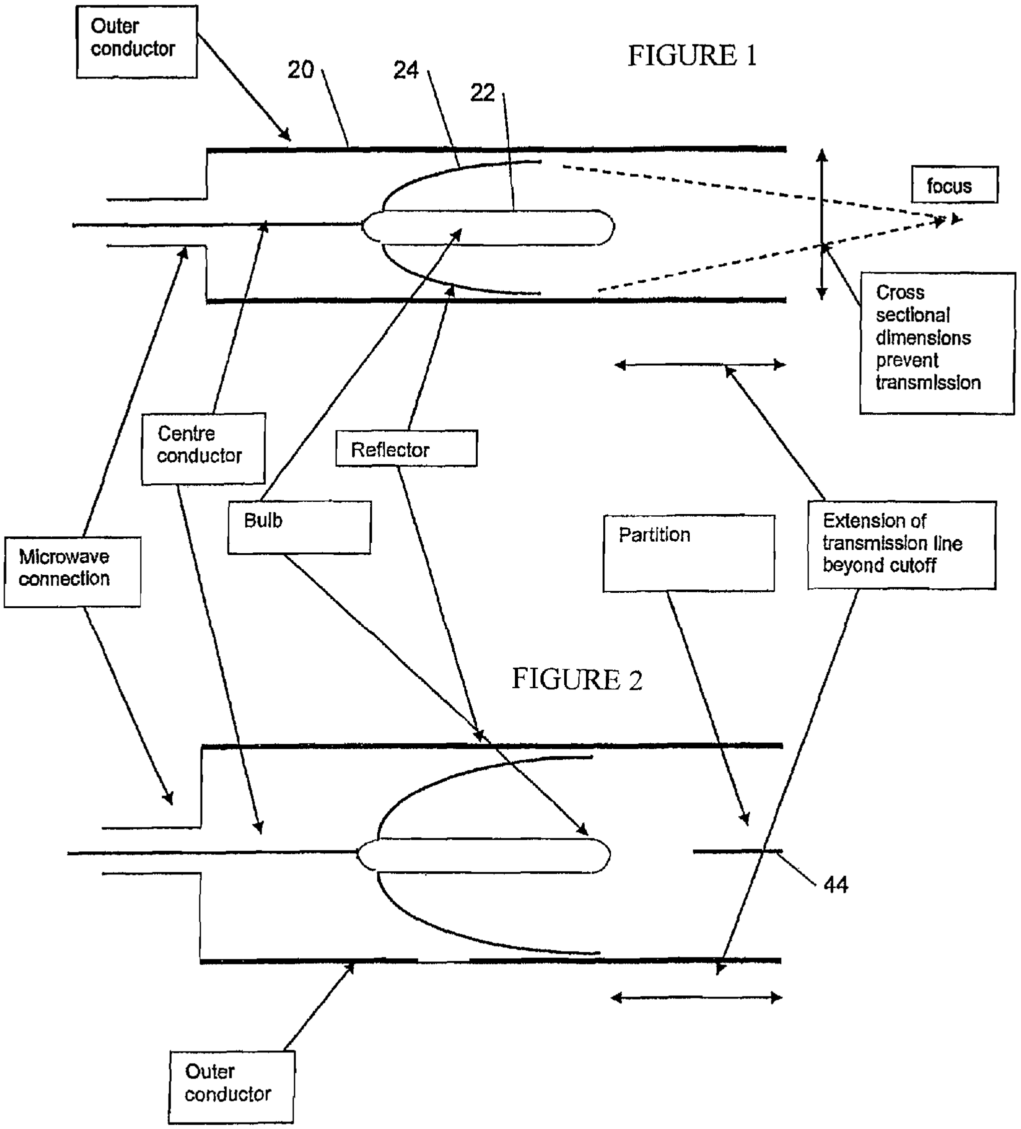
FIG. 1 is a schematic cross-section of a first embodiment in accordance with the invention.
FIG. 2 is a schematic cross-section of a first embodiment including a partition in accordance with the invention.

In a first embodiment as shown in FIG. 1, an outer electrical conductor 20 is generally cylindrical and is typically manufactured from polished aluminium or stainless steel or a similar material. At one end microwave energy is applied coaxially either directly or via a suitable cable to the outer conductor 20 on one part and to a cylindrical bulb 4 passing generally down the centre line of the outer conductor 20 as the other part. As microwave energy is applied, the bulb 22 is energised evenly along its length by virtue of the fact that as a lossy conductor, it behaves as the centre conductor in the coaxial system formed by the outer conductor 20 and the bulb 22. The outer conductor 20 is dimensioned to extend beyond the end of the bulb 22 sufficiently such that the tube of the outer conductor 20 beyond the end of the bulb operates beyond cut-off and thus prevents any emission of microwave energy.

Preferably in this first embodiment there is also a reflector, such as a conical or elliptical reflector 24 placed around the bulb so that the centre line of the circular reflector is in line with the centre line of the bulb and so that as much of the light emitted from the side walls of the bulb as possible is reflected towards the open end of the outer conductor 20 and preferably onto a point or area of very small diameter and thus providing high light intensity and concentration. The reflector is generally non-conductive and thus has little effect on the rf field distribution thus allowing the reflector shape to be dictated by optical requirements.

This embodiment is particularly suitable for applications such as UV point/spot curing, transmitting UV light to a lightguide or applications such as illumination or projection where high intensity UV/visible light sources are desirable.

Figure 3:
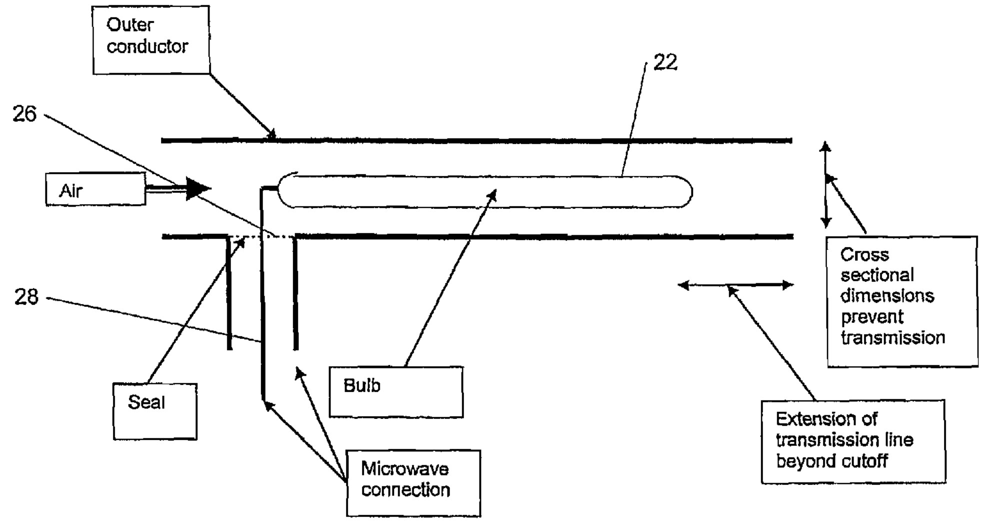
FIG. 3 is a schematic cross-section of a further embodiment in accordance with the invention.

In a second embodiment as shown in FIG. 3, rf energy is introduced through the side of an outer conductor 20', which may be cylindrical or some other shape, and a seal 26 is used to ensure rf integrity. This allows the outer conductor 20' to be open at both ends. A bulb 22' is used as before, as a centre conductor in a coaxial system.

The bulb 22' is shorter than the outer conductor 20' at both ends such that the tube sections of the outer conductor that extend beyond the ends of the bulb are beyond cutoff which thus prevents any emission of microwave energy.

Rf/microwave energy may be supplied via a co-axial cable 28 passed inside or outside the outer conductor and coupled to the bulb 22' at a suitable point inside the tube 20'. In this case the bulb 22' may be used to irradiate air or other gases that are passed down the outer conductor being used as a pipe. Applications for this embodiment may include air treatment or photochemical reactions.

Figure 4:
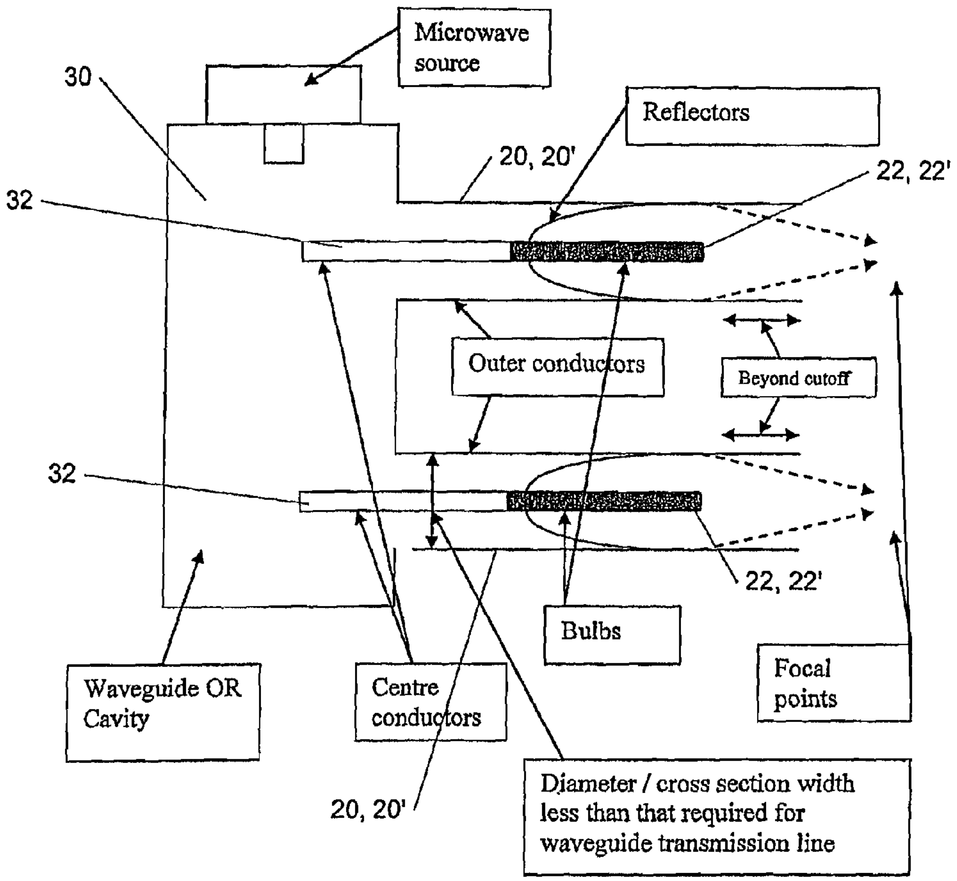
FIG. 4 is a schematic cross-section of a further embodiment in accordance with the invention.

In a third embodiment as shown in FIG. 4, a plurality of outer conductors 20, 20', such as those suitable for use in the first and second embodiments, may be connected into one or more faces of a conductive resonant rf/microwave cavity or waveguide 30 in such a way that the outer conductor makes good electrical conduct with the cavity and the bulb or centre conductor connection from each outer conductor extends into the resonant cavity/waveguide 30 so that it can be efficiently coupled to the energy within the said cavity/waveguide 30. Optionally, conductive centre conductors 32, which extend into the cavity 30, may be used to couple to the inner end so of the bulbs 22, 22'. Furthermore, any conductive part may be made of mesh to aid cooling.

Figure 5:
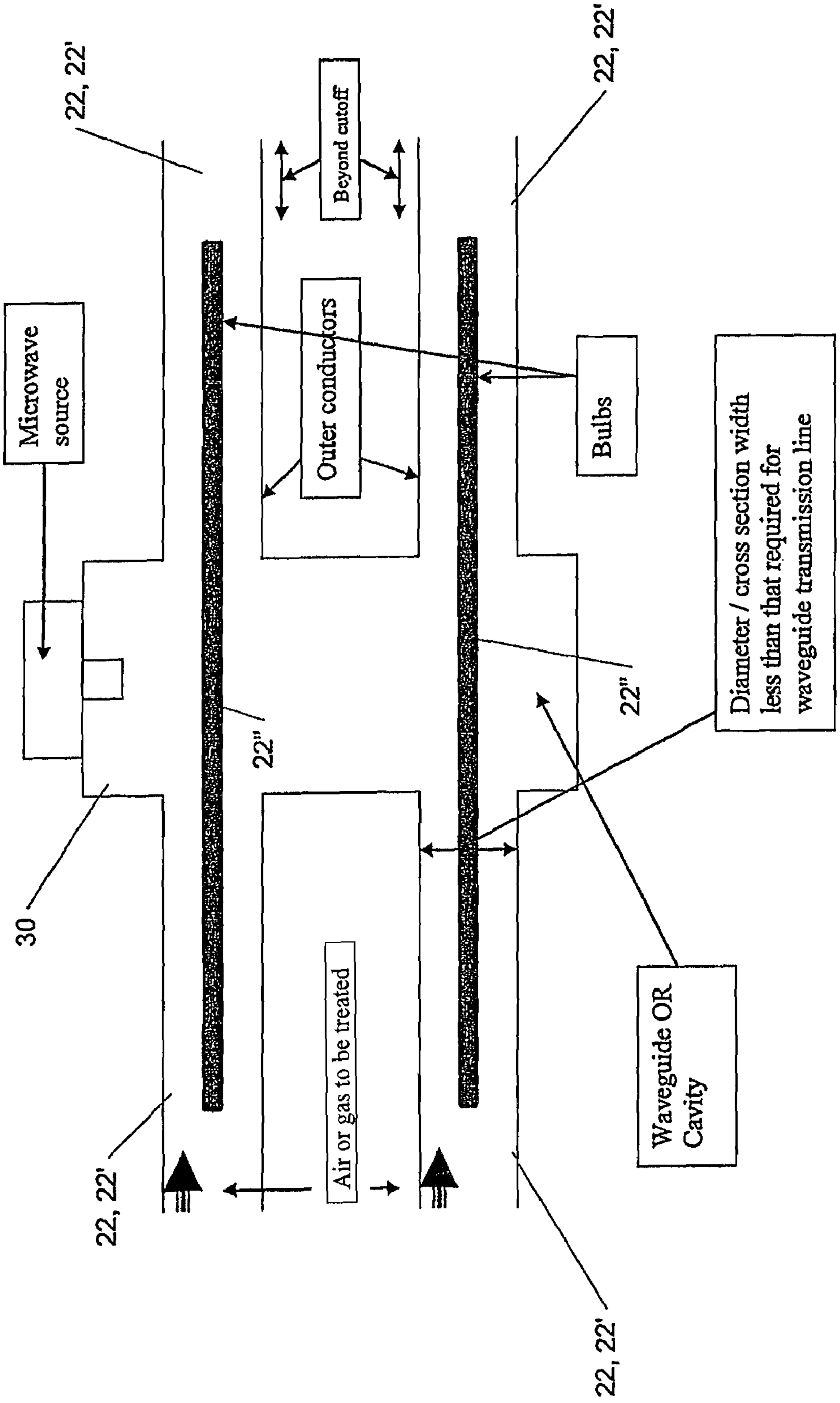
FIG. 5 is a schematic cross-section of a further embodiment in accordance with the invention.

With reference to FIG. 5, in a preferred variation of the third embodiment, outer conductor tubes 20, 20' may be mounted on opposite sides of the resonant cavity 30 so that a single bulb 22" may act as the centre conductor in opposing tubes, may pass through the cavity/waveguide 30 and be efficiently coupled to the rf/microwave field within it.

Figure 7:
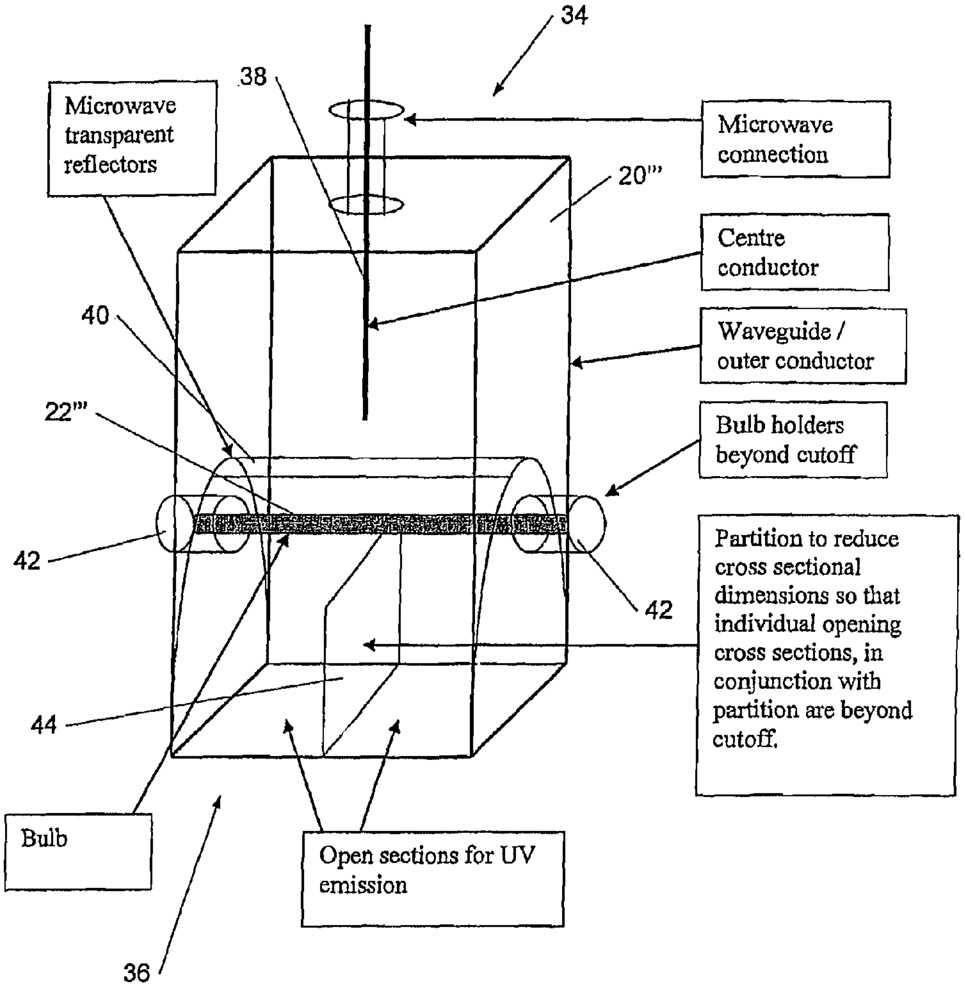
FIG. 7 is a schematic cross-section of a further embodiment in accordance with the invention.

With reference to FIG. 7, in a fourth embodiment the outer conductor 20'" is conductive and may be cylindrical or some other shape, and should be of cross-sectional dimensions so that it operates as a tube beyond cut off to prevent rf emissions as discussed above.

Preferably, the outer conductor 20'" has a coupling end 34 and a UV emission end 36. Transmission of microwaves from a microwave source into the outer conductor 20'" may be directly from a source such as a magnetron or via co-axial cable. In this embodiment the bulb 22'" may be mounted transversely across the outer conductor and energised from microwaves transmitted within it coaxially via a metallic centre conductor 38 which extends close to the bulb 22'" to couple with the bulb.

Preferably in this embodiment, one or more reflector 40, transparent to rf/microwave energy, is mounted around the bulb 22'" to maximise emission from the emission end 36 and to achieve a concentration and focus so that it may be practically used. Preferably also the bulb 22'" shall be mounted between two opposite holes 42'" in the outer conductor that are tubular to the point of cutoff to prevent microwave leakage from the side of the outer conductor. This arrangement helps to ensure that the bulb 22'" is illuminated to the edges of the outer conductor 20'".

Preferably also, one or more electrically conductive partition 44 is located adjacent the emission end 36 to ensure the open dimensions of the conductor 20'" are small enough to remain beyond cut-off in operation.

Each conductive partition 44 is in full electrical contact with the outer conductor 20'", and acts as a longitudinal divider(s) will is added to the inside of the outer conductor at the emission end 36 to reduce the dimensions of the outer conductor in cross section so that it cannot act as a waveguide at this point. The length of such partitions is such that the divided sections of outer conductor thus created form tubes that are beyond cut off and thus prevent any rf/microwave emission.

This type of approach may, for example, be applied to the embodiment shown in FIG. 1 as shown in FIG. 2.

It will be appreciated that the outer conductor in any one of the above embodiments will be conductive and may be cylindrical or some other shape and may be of cross-sectional dimensions greater than that required so that it can act as a tube beyond cut off. It may be, for example, of standard waveguide dimensions. As this applies to the fourth embodiment the transversely mounted bulb will be energised directly from microwaves transmitted down the outer conductor functioning as an independent waveguide.

Figure 6:
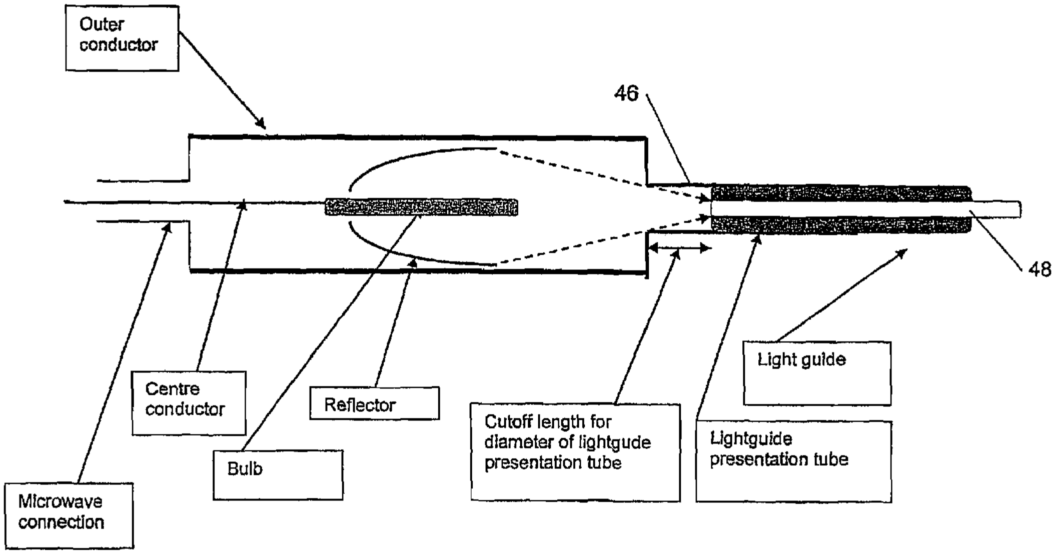
FIG. 6 is a schematic cross-section of a further embodiment adapted for feeding a light guide in accordance with the invention.

In a further variation as shown in FIG. 6, a smaller diameter tube 46, consequently with a shorter rf/microwave cutoff length, and thus a shorter overall length may replace the final emission section of any of the embodiments above.

Such a smaller diameter tube may be designed to accommodate the input end of a lightguide 48 such as those supplied for spot UV curing applications and available from Jenton International Ltd., a UK Limited company. Optionally also, a plurality of such smaller diameter tubes may be added to the final emission end of the outer conductor in the above embodiments.

What is claimed is:

1. A housing for a coaxially mounted elongate electrodeless bulb which is energizable by an rf field, such as a microwave field, preferably at or around 2.45 GHz, wherein: the housing is constructed of electrically conductive material arranged to have a substantially opening through which the bulb is visible from outside the housing; and wherein the housing is arranged to hold an electrodeless bulb in a position which is recessed into the housing such that in use, the electrodeless bulb is energized as a result of its position within the conductive housing and the housing is dimensioned to extend beyond the end of the bulb sufficiently such that the adjacent parts of the housing beyond the end of the bulb operate beyond cut-off and thus prevents any emission of microwave energy.

2. The housing according to claim 1, wherein the housing is arranged to hold the bulb aligned with the central axis of a generally cylindrical section of the housing and wherein if energy is fed from one end of the cylindrical section.

3. The housing according to claim 1, wherein the housing is arranged to hold the bulb aligned with the central axis of a generally cylindrical section of the housing and wherein rf energy is fed from one end of the cylindrical section and the conductive nature of the bulb when energized in combination with the housing acts as an rf transmission line.

4. The housing according to claim 1, wherein the housing is arranged to hold the bulb aligned with the central axis of a generally cylindrical section of the housing and wherein rf energy is fed from the side of the cylindrical section whereby the cylindrical section is open for the passage of a gas past the bulb.

5. The housing according to claim 1, wherein the housing is arranged to hold the bulb aligned with the central axis of a generally cylindrical section of the housing and wherein rf energy is fed from the side of the cylindrical section whereby the cylindrical section is open for the passage of a gas past the bulb and the conductive nature of the bulb when energized in combination with the housing acts as an if transmission line.

6. The housing according to claim 1, including two of the tubular sections formed in alignment on opposite faces of the resonant or waveguide sections and the housing being arranged to hold the bulb so that it simultaneously enters both tubular sections and spans the space between the said opposite spaces of the resonant section.

7. The housing according to claim 1 wherein the bulb is backed by a reflector.

8. The housing according to claim 1 wherein the bulb is surrounded by a reflector directed towards a focal point.

9. The housing according to claim 1, adapted to couple light from the bulb into a lightguide.

10. The housing according to claim 1, adapted to couple light from the bulb into a lightguide wherein the lightguide is shielded from rf energy by virtue of being in a tube dimensioned to attenuate rf energy between its opening and the position of the lightguide within it.

11. The housing according to claim 1 wherein the housing is constructed partially of conductive mesh and which is substantially transparent to visible light.

12. The housing according to claim 1 wherein the housing is constructed partially of conductive mesh and which is substantially transparent to UV light.

13. The housing according to claim 1 wherein the housing is tubular but not cylindrical.

14. The housing according to claim 1 optimized to emit UV light.

* * * * *